United States Patent [19]
Liu

[11] Patent Number: 5,142,889
[45] Date of Patent: Sep. 1, 1992

[54] AUTOMOBILE STEERING LOCK

[76] Inventor: Steve Liu, No. 304, Chung Cheng South Road, Yung Kang Hsiang, Tainan Hsien, Taiwan

[21] Appl. No.: 685,675

[22] Filed: Apr. 16, 1991

[51] Int. Cl.$^5$ ............................................. B60R 25/02
[52] U.S. Cl. .......................................... 70/209; 70/226
[58] Field of Search ................. 70/209, 225, 226, 211, 70/212, 237, 238

[56] References Cited

U.S. PATENT DOCUMENTS

| | | | |
|---|---|---|---|
| 4,660,394 | 4/1987 | Wu | 70/238 X |
| 4,738,127 | 4/1988 | Johnson | 70/209 |
| 4,887,443 | 12/1989 | Wang | 70/226 X |
| 4,935,047 | 6/1990 | Wu | 70/238 X |
| 5,031,428 | 7/1991 | Jan et al. | 70/226 X |
| 5,040,388 | 8/1991 | Chen | 70/209 |

Primary Examiner—Lloyd A. Gall
Attorney, Agent, or Firm—Bacon & Thomas

[57] ABSTRACT

An antitheft device for attachment to a steering wheel of an automobile comprising an elongated body member having a passageway extending along an axis therein, first hook secured to the body member for engagement with a portion of the steering wheel, an elongated tubular member adapted to move in telescopic fashion in the passageway of the body member along the axis, second hook secured to the tubular member for engaging the inside portion of the steering wheel diametrically opposed to the first hook a rod member adapted to move in telescopic fashion within the tubular member for preventing the steering wheel from complete rotation and a lock associated with the body member engaging the tubular member and rod member within the passageway that allows the tubular member and the rod member to extend with respect to the body member and to be locked at any of a plurality of positions.

2 Claims, 3 Drawing Sheets

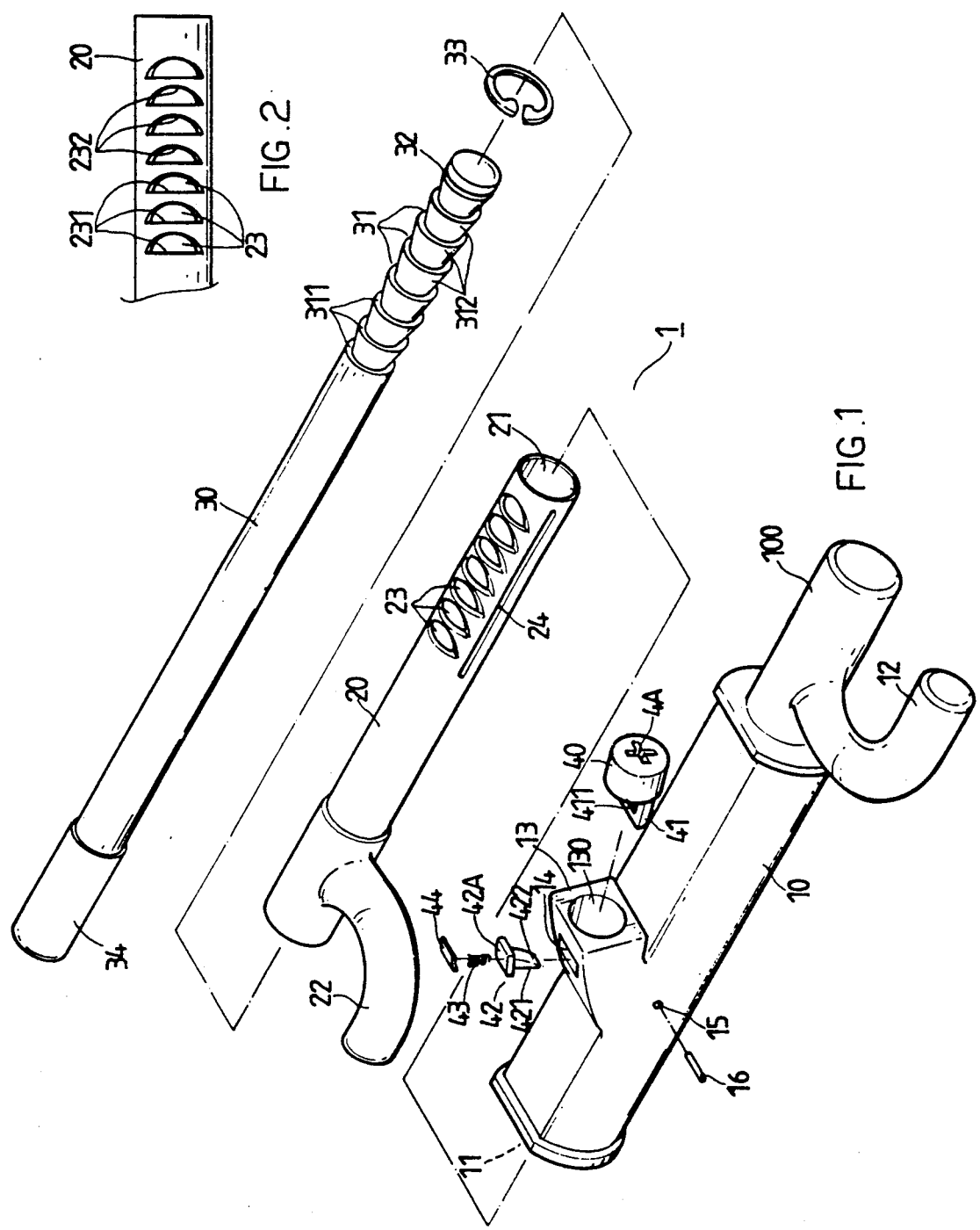

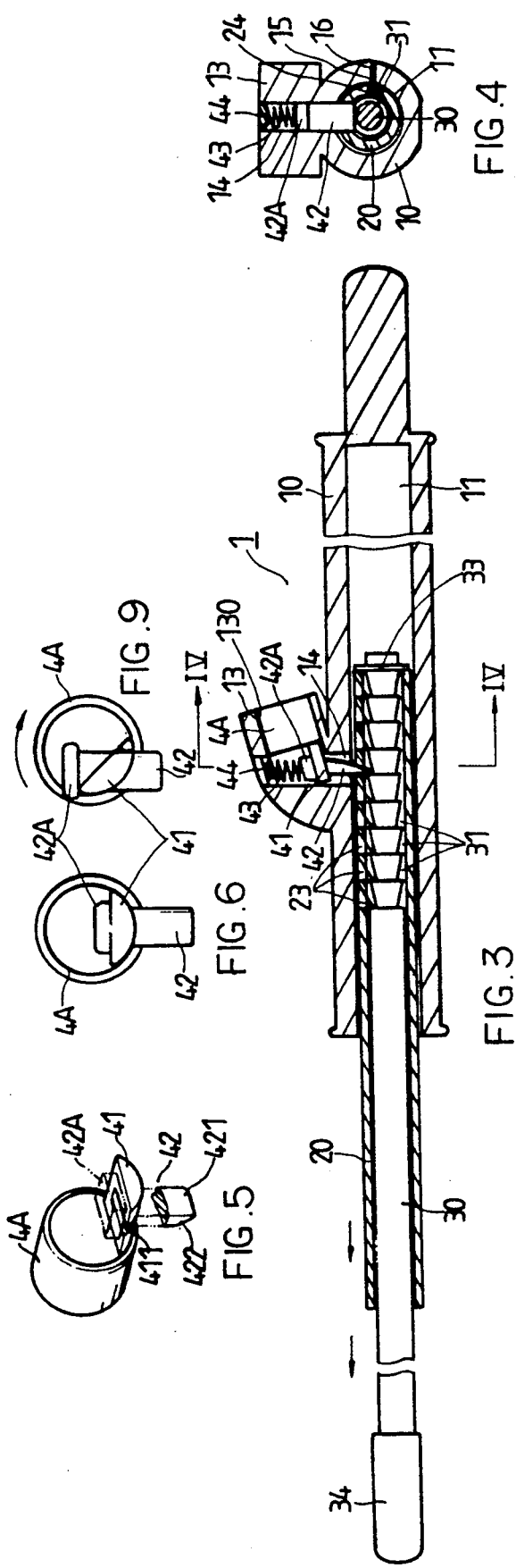

AUTOMOBILE STEERING LOCK

FIELD OF THE INVENTION

The present invention relates to an automobile antitheft device, and more particularly to a device for attachment to an automobile steering wheel to prevent complete rotation thereof for securing against unauthorized driving.

BACKGROUND OF THE INVENTION

Antitheft device which attach to an automobile steering wheel have been known heretofore, as shown in U.S. Pat. No. 4,738,127 to Johnson. Such an antitheft device for attachment to a steering wheel of an automobile includes an elongated body member having a passage extending along an axis therethrough, an elongated rod member adapted to move in telescopic fashion in the passage way of the body member along the axis, opposed hooks for engaging the inside portion of the steering wheel and lock means associated with the body member engaging the rod within the passage for locking the rod within the passage for locking the rod member stationary with respect to the body member at any of a plurality of positions.

U.S. Pat. No. 4,887,443 to Wang and U.S. Pat. No. 4,935,047 to Wu disclose two antitheft devices yet similar in construction. These devices include a rod-like bearing means slidably mounted in a transverse passageway of a housing means and having a tenon member attached to an end of the rod-like bearing means and arranged to be actuated between a locking position with the tenon member protruding into an annular groove in the circumference of a rod member, which is adapted to telescope freely within a body member, and an unlocking position with the tenon member withdrawn from annular groove and opposed vertical side walls between a locking member being controlled to position the tenon member in its locking or unlocking position.

While the antitheft devices described above are functional, they include several defects. For example, in order to block complete rotation of the steering wheel of a motor vehicle, each device has an extended portion resulting the device being too long in length to be carried in cabinet of the motor vehicle.

SUMMARY OF THE INVENTION

It is according a primary object of the present invention to provide an automobile steering lock that overcomes the foregoing defects associated with the prior art.

Another object of the present invention is to provide an automobile steering lock which can extend in two stages so as to reduce its length in the collapsed state.

A further object of the present invention is to provide a locking device wherein the locking mechanism is totally enclosed therein and includes no area susceptible to prying by a crowbar, rigid pin or the like.

BRIEF DESCRIPTION OF THE DRAWINGS

FIG. 1 is an exploded perspective view illustrating a preferred embodiment of the present invention;

FIG. 2 is an enlarged top elevation of an end portion of a tubular member showing that a plurality of openings in a row are formed in its side wall;

FIG. 3 is a cross-sectional view of the preferred embodiment which is in an assembled and locking condition;

FIG. 4 is a cross-sectional view taken along line IV—IV in the FIG. 3;

FIG. 5 is a perspective view of a lock mechanism to be used in the present invention;

FIG. 6 is a front elevation of the lock mechanism shown in FIG. 5 showing the lock mechanism in its locking condition;

FIG. 7 is a cross-sectional view of the preferred embodiment which is in an assembled and unlocking condition;

FIG. 8 is a cross-sectional view taken along line VIII—VIII in FIG. 7;

FIG. 9 is a front elevation of the lock mechanism shown in FIG. 5 showing the lock mechanism in its unlocking position.

DETAILED DESCRIPTION OF A PREFERRED EMBODIMENT

Figure 10:
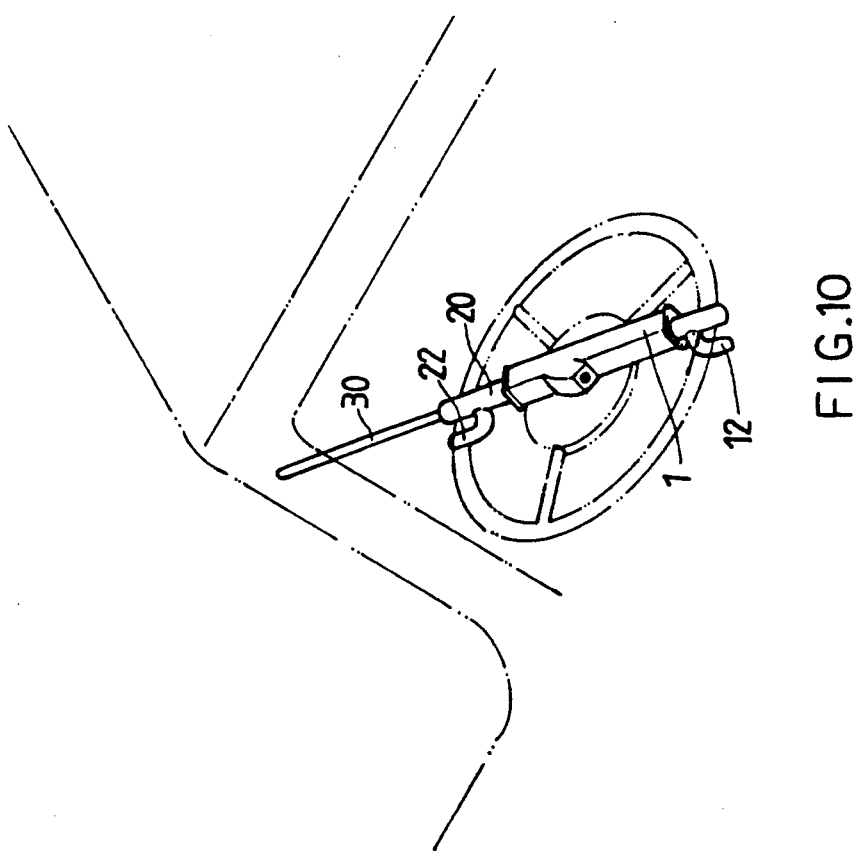
FIG. 10 is a diagramatic perspective view showing the steering lock of the present invention engaged on a steering wheel of a vehicle.

Referring to FIG. 1, an automobile steering lock 1 according to the present invention which comprises an elongated body member 10, an elongated tubular member 20 which is dimensioned to move in telescopic fashion within body member 10, an elongated rod member 30 which is dimensioned to move in telescopic fashion within the tubular member 20, hooks 12, 22 for engaging opposed portions of a steering wheel from the inside thereof, being respectively provided on the body member 10 and tubular member 20, a housing 13 and a locking mechanism including a locking means 40, an actuating member 41 and a locating means 42, being provided within the housing 13 to position and lock the tubular member 20 and rod member 30 stationary with respect to the body member 10 at one of a plurality of positions.

Said body member 10 includes an elongated tube 10 terminating with a solid iron bar 100 and defining a central passage 11 extending longitudinally from an open front end to a closed rear end. Said first generally L-shaped member 12 is fixedly secured to one side of the iron bar 100 by means of welding to form a hook 12 which opens rearwardly along the body member 10. Said tubular member 20 includes an elongated tube 20 of circular cross-section of which the outer diameter is dimensioned slightly less than the diameter of the central passage 11 in the body member 10 to enable tubular member 20 to telescope freely within the body member 10 and defines a second cylindrical central passage 21 extending axially therethrough.

Second generally L-shaped member 22 is fixedly secured to the front end portion of the tubular member 20 to form a hook 22 which opens opposite to the hook 12 for engagement with a diametrically opposed portion of a steering wheel. A guide trough 24 is longitudinally formed in a side surface of the rear half portion of the tubular member 20 and a plurality of openings 23 are longitudinally aligned in a top surface of the rear half portion in an evenly spaced-apart relation. Each of the openings 23, as best shown in FIG. 2, consists of a vertical side wall 231 relatively close to the second hook 22 and a slope side wall 232 relatively far from the second hook 22.

Said rod member 30 includes an elongated rod 30 of circular cross section of which the diameter is dimensioned slightly less than the diameter of the second passage 21 in the tube 20 to enable the rod member 30 to telescope freely within the tube 20. A handle 34 is attached to the outer end of the rod member 30 and a plurality of annular grooves 31 are axially aligned along a rear portion in the circumference of the rod member 30. Each of the grooves 31 consists of a vertical side wall 311 relatively close to the handle end 34 and substantially perpendicular to its longitudinal axis and a convex or slope side wall 312 relatively far from the handle end 34. A substantially C-shaped clip 33 is provided for engaging an extreme circumferential groove 32 close to the rear end of the rod member 30. The outer circumference of the C-shaped clip 33 is dimensioned slightly less than the diameter of the central passage 11 in the body member 10 to enable the C-shaped clip 33 to slide freely in the body member 10, yet slightly bigger than the diameter of the second passage 21 in the tubular member 20 to limit the extension movement of the rod member 30 with respect to the tubular member 20 by abutting the C-shaped clip 33 against the outer extreme end of the tubular member 20, as best shown in FIGS. 3 and 7.

Referring to FIGS. 1, 3 and 4, said housing 13 is connected to the front portion of the body member 10 and includes a boss integrally offset with respect to the axis of the body member 10 and having a bore 130 extending transversely into the housing 13 for firmly receiving the locking means 40 which has a conventional key lock 4A and the actuating member 41 attached to the inner end of the key lock 4A.

To accomodate the locating means 42, a passage 14 is vertically bored from a top wall of the housing 13 into the same to facilitate inserting the locating means 42 into the housing 13. Said passage 14 extends across the bore 130 and communicates the central passage 11 in the body member 10. A metal plate 44 is provided to be restored in the outer opening of the vertical passage 14 by means of a press-fit after its assembly.

A pin hole 15 is formed in a side wall of the body member 10 and extends transversely into the central passage 11 in the body member 10. A pin 16 is inserted into the pin hole 15 by means of a press-fit and protrudes inwardly therefrom into the guide trough 24 to guide the tubular member 20 to move axially yet prevent rotation of the tubular member 20 with respect to the body member 10.

As shown in FIGS. 1, 3, 4 and 5, the locating means 42 is a rod-like bearing which is formed with a top flange 42A and a tapered end formed with a vertical side wall 421 relatively far from the first hook 12 and a slope or convex side wall 422 opposite to the vertical side wall 421 and relatively close to the first hook 12 when the rod-like bearing 42 is installed in the vertical passage 14 and a coil spring 43 is installed in the vertical passage 14 between the top flange 42A of the rod-like bearing 42 and the metal plate 44 to bias the rod-like bearing 42 towards the central passage 11 in the body member 10.

As shown in FIG. 5, the actuating member 41 is a segment in cross-section, attached to the front end of the lock 4A and formed with a slot 411 for retaining the rod-like bearing 42 by resting the top flange 42A of the rod-like bearing 42 on a flat top of the actuating member 41.

In assembly, as best shown in FIGS. 3 and 7, the rod-like bearing 42 is inserted into the vertical passage 14 and the cylindrical key lock 4A is firmly received in the bore 130 to retain the rod-like bearing 42. The coil spring 43 is mounted between the top flange 42A of the rod-like bearing 42 and the metal plate 44 which is now restored in the top opening of the vertical passage 14.

In operation, the rod-like bearing 42 is biased by the spring 43, which is normally in compressed condition, towards the tubular member 20 in which the rod member 30 is received whereas the tapered or tenon end of the bearing 42 protrudes into an opening 23 of the openings in row and into an annular groove 31 of the rod member 30 thereby to lock the tubular member 20 and the rod member 30 stationary with respect to the body member 10 at one of a plurality of positions, as best shown in FIGS. 3 and 4. Although in locking condition, the convex or slope side walls 232, 312 of the openings 23 and the grooves 31 allow the tubular member 20 and the rod member 30 of this antitheft device to extend with respect to the body member 10, yet the vertical side walls 231, 311 engaged with the tenon end of the rod-like bearing 42 prohibits the tubular member 20 and the rod member 30 from a collapse movement with respect to the body member 10. The extension of the tubular member 20 allows this antitheft device 1 to engage opposed portions of a steering wheel from the inside thereof with its hooks 12, 22 and the extension of the rod member 30 from the tubular member 20 prevents the steering wheel from complete rotation, as best shown in FIG. 10.

Referring to FIGS. 7 and 8, when the actuating member 41 is rotated clockwise from a locking position, as shown in FIG. 6, into an unlocking position, as shown in FIG. 9, by the key lock 4A with a key 4B, as shown in FIG. 7, the rod-like bearing 42 is raised by overcoming a biasing force of the coil spring 43 to withdraw the tenon end of the bearing 42 from the opening 23 of the tubular member 20 and the groove 31 of the rod member 30 into the vertical passage 14 thereby the rod member 30 and the tubular member 20 can telescope in and out with respect to the body member 10 for extension or collapse movement of the device. The collapse movement of this antitheft device allows this device to be detached from the steering wheel.

While the invention has been described with respect to preferred embodiment, it is obvious that various modifications can be made therein without departing from the spirit of present invention which should be limited only by the scope of the claim.

What is claimed is:

1. An antitheft device for attachment to a steering wheel of an automobile comprising:

a first elongated tubular member having an inner open end, a closed outer end and an elongated passageway extending along its axis, a solid iron bar extending outwardly from the closed outer end and a first U-shaped hook extending from the solid iron bar to engage said steering wheel from the inside thereof with an outer end of said solid iron bar extending a substantial distance beyond the periphery of said wheel;

a second elongated tubular member having an inner end, an outer end and a second elongated passageway extending along its axis therethrough, the second tubular member being adapted to extend in a telescopic manner within said elongated passageway of the first tubular member and a second U-shaped hook secured to the inner end of the second tubular member, having an opening facing opposite to the first U-shaped hook and adapted to engage said steering wheel from the inside thereof;

said second elongated tubular member having an elongated groove formed axially in a surface of a side wall of the second tubular member;

a pin hole transversely located in a side wall of the first tubular member so as to communicate with the elongated passageway in the first tubular member;

a pin press-fitted in the pin hole and protruding inwardly from the pin hole into the elongated groove for guiding the second tubular member to move axially yet preventing the second tubular member from rotation with respect to the first tubular member;

a plurality of openings axially aligned in a portion of a side wall close to the outer end of the second tubular member in an evenly spaced-apart relation;

a rod member adapted to extend in a telescopic manner within said second elongated passageway of said second tubular member and having an inner end formed with a handle and a plurality of spaced annular grooves circumferentially formed in a portion close to an outer end of the rod member;

a substantially C-shaped clip member engaged in an annular groove in an extreme outer end of the rod member with its outer circumference adapted to slide within the elongated passageway in the first tubular member and dimensioned to abut against the outer end of the second tubular member to limit the extension movement of the rod member with respect to the second tubular member;

a housing means firmly formed on the first tubular member close to the outer end of the first tubular member;

a lock;

a bore means offset with respect to the axis of the first tubular member defined in the housing means for firmly receiving the lock;

a vertical passageway bored from an outer side wall of the housing means and extending radially into the same to interconnect the bore means and the elongated passageway in the first tubular member;

rod-like bearing means including a rod-like bearing slidably accommodated in the vertical passageway in the housing means and having a tenon member attached to an end thereof and arranged to be actuated between a locking position with the tenon member protruding into an opening in the second tubular member and an annular groove in the rod member and an unlocking position with the tenon member withdrawn from the opening and annular groove;

actuating member means for interconnecting the lock and the rod-like bearing means so as to control the position the tenon means in a locking or unlocking position through the rod-like bearing means member by means of the lock; and a spring biasing the rod-like bearing towards the elongated passageway in the first tubular member.

2. An antitheft device for attachment to a steering wheel of an automobile as claimed in claim 1 wherein:

each of the spaced annular grooves in the rod member consists of a vertical side wall relatively close to the handle and a convex or slope side wall relatively far from the handle; each of the axially aligned openings in the side wall of the second tubular member consists of a vertical side wall relatively close to the second hook and a slope side wall relatively far from the second hook; and wherein the tenon member of the rod-like bearing means consists of two opposite side walls including a vertical side wall, relatively close to the inner end of the first tubular member and a slope or tapered side wall relatively far from the inner end of the first tubular member to allow an extension movement of the second tubular member with respect to the first tubular member and the rod member with respect to the second tubular member when the rod-like bearing means is positioned in its locking position.

* * * * *